Jan. 16, 1962

R. L. CARSON ETAL 3,017,565

TEMPERATURE RESPONSIVE RESISTOR

Filed Sept. 12, 1960

INVENTORS
ROBERT L. CARSON
WALTER F. CONRAD
BY *Fulwider, Mattingly
& Huntley*
ATTORNEY

United States Patent Office 3,017,565
Patented Jan. 16, 1962

3,017,565
TEMPERATURE RESPONSIVE RESISTOR
Robert L. Carson, 701 Wiamea Drive, El Cajon, Calif., and Walter F. Conrad, 2551 Mulder St., Lemon Grove, Calif.
Filed Sept. 12, 1960, Ser. No. 55,591
6 Claims. (Cl. 323—74)

The present invention relates to new and improved temperature responsive resistors and the like, and more particularly to a resistor with a thermal response or temperature coefficient whose effect on the resistance value is adjustable.

In various communication and other controllable electrical circuits it is frequently important to be able to compensate for the thermal response of an electrical component. The present resistor device is designed to meet this need and compensate for the variation in performance of an electrical circuit component under a variety of operating temperature conditions.

More particularly, there may be a change in ohmic resistance of a circuit component with change in temperature, the resistance change commonly being caused by power dissipation resulting from the passage of current through the component at unusually high currents. The transistor is a typical example of a common circuit component which is unusually susceptible to a change in characteristics with a change in temperature.

Various prior art devices exist for compensating for the changes in operating characteristics of such circuit components at various temperatures, the most common of such devices being thermistors. Thermistors operate on the principle of a change in electrical resistance of the material thereof with temperature. The material of thermistors requires critical controls in their manufacture, and it is very difficult to obtain uniformity of operation of even the same type of thermistor. In addition, such prior art devices as the thermistor provide only a limited and fixed range of temperature coefficient compensation. After manufacture, the usual thermistor temperature coefficient characteristic cannot be adjusted or varied. Other devices, such as wire wound resistors, semiconductor resistive units, and the like are also limited or fixed insofar as their temperature coefficient is concerned. Thus, such prior art devices provide only an approximation in compensation. Aging and overload also cause changes in the thermal characteristics of such devices over the period of their life.

According to the present invention, a resistor device is provided whose response to a variation in ambient operating temperatures is adjustable at any time to precisely match the thermal coefficient of the electrical circuit device or component which is to be controlled. The present resistor device includes a pair of resistor elements which have temperature coefficients which are not equal. There will hereinafter be described various embodiments of the present resistor device, but one example includes a resistor element which is not particularly responsive to temperature change, and a second resistor element which is responsive to temperature changes to a predetermined degree. These two resistive elements are electrically coupled by a movable member or wiper whose position may be adjusted with respect to the two resistive elements. The position of the wiper dictates the degree of change of the present resistor device to a change in temperature, to thereby exactly match the temperature response of the resistor device with the temperature coefficient of the component which is to be controlled.

Other objects and features of the present invention will be readily apparent to those skilled in the art from the following specification and appended drawings wherein is illustrated a preferred form of the invention, and in which.

Figure 1:
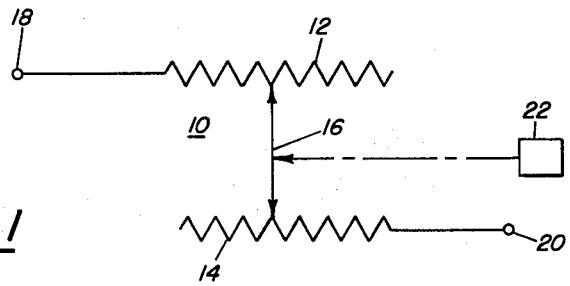
FIGURE 1 is a diagrammatic representation of a resistor device according to the present invention.
Figure 2:
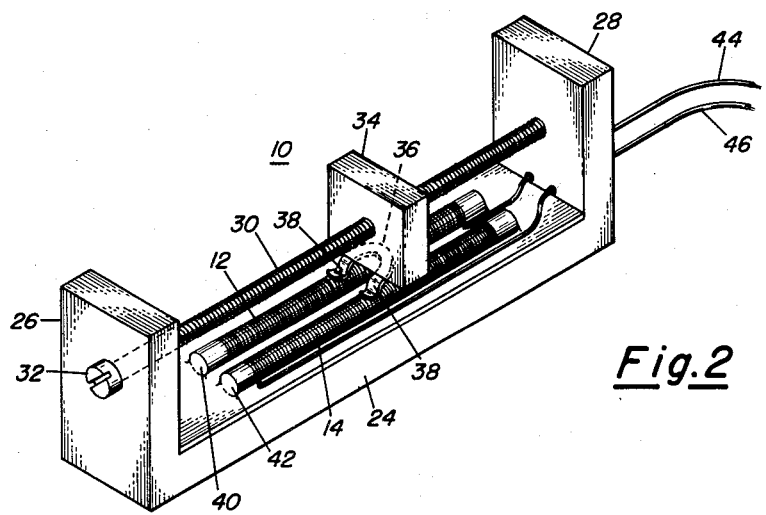
FIGURE 2 is a perspective view of one form of the present invention.

Referring now to the drawings, and particularly FIGURES 1 and 2, there is illustrated a resistor device 10 according to the present invention, and comprising, generally, a resistor element 12 and a resistor element 14, elements 12 and 14 being insulated from each other except for a wiper 16. The external connections to device 10 are made at a pair of terminals 18 and 20. Wiper 16 is movable by any suitable means 22.

Elements 12 and 14 are, in one embodiment, selected to have at a standard temperature, which is usually 25 degrees centigrade, the same resistance or conductivity, and to be equivalent in resistance per unit length along the surfaces thereof contacted by wiper 16. Accordingly, the resistance of resistor 10 will, at 25 degrees centigrade, be the same regardless of the position of wiper 16 along the lengths of resistive elements 12 and 14. The current path through the device 10 is from terminal 18 through a portion of element 12, thence through wiper 16, and thence through a portion of element 14 to terminal 20.

To more completely understand the operation of resistor device 10, assume element 12 has an increase in resistance of 4500 parts per million per degree centigrade increase in temperature. This can be accomplished by using a Balco wire, purchased from the Wilbur Driver Company. Of course, this particular value is merely exemplary, and various other types of wire, metal films, thermistor materials, or the like can be used to achieve the temperature coefficient desired.

Next, assume element 14 is composed of a low temperature coefficient material, such as may be purchased under the trademark Evanohm, and that at 25 degrees centigrade it has the same resistance as element 12. It will be seen that at temperatures other than 25 degrees centigrade, elements 12 and 14 will have a difference in resistance depending upon the difference in their temperature coefficients and the temperature deviation from 25 degrees centigrade.

Further, assuming that elements 12 and 14 have a nominal 1000 ohms resistance at 25 degrees centigrade, if the temperature rises from 25 degrees centigrade to 35 degrees centigrade, element 12 will exhibit a resistance change over its length of 45 ohms, and element 14 a resistance very close to the nominal resistance of 1000 ohms, as before. Thus, resistor unit 10 is capable of adjusting the total resistance between terminals 18 and 20 over the range of 1000 to 1045 ohms. If wiper 16 is in its leftmost position, as viewed in FIGURE 1, the current path is entirely through element 14, and the resistance is 1000 ohms. If wiper 16 is in its rightmost position, the current path is entirely through element 12, and the resistance is 1045 ohms.

For any position of wiper 16 intermediate these extreme positions, current will flow through portions of both elements 12 and 14 and will result in a total resistance of 1000 ohms plus or minus the resistance change due to the deviation in temperature from 25 degrees centigrade.

From the above, it is seen that device 10 is operative very much in the fashion of a fixed resistor, but having the added advantage of a thermal response or temperature coefficient that can be adjusted over a comparatively wide range. This adjustment can be made to compensate for such variations in operation of a circuit component as may occur by reason of temperature changes. The operating characteristic of the circuit component can thus be precisely compensated so that uniform operation over the controlled temperature range is provided.

Both elements 12 and 14 can be made thermally sensitive, it being important only that the thermal response of the elements be different. If element 12 has a high positive temperature coefficient, and element 14 has a high negative temperature coefficient, the range of control will be correspondingly greater. Further, this arrangement allows device 10 to function as a zero temperature coefficient element by locating wiper 16 on elements 12 and 14 at those points where the positive and negative temperature coefficients cancel each other. A negative temperature coefficient can be provided, as is well known in the art, by employing materials including, for example, cobaltic oxide, manganese oxide, stannic oxide, or iron oxide.

FIGURE 2 illustrates an embodiment of device 10 comprising a support frame having a base 24 and a pair of integral end plates 26 and 28, the support frame being made out of an electrical insulating material, or suitably coated with such a material. A threaded rod 30 is rotatably carried within plates 26 and 28, and includes a screw head 32 at one end which may be operated to rotate the threaded element 30.

A slider block 34 made of suitable electrical insulating material is threadably carried by member 30 and is adjusted in position between plates 26 and 28 by operation of the screw head 32.

An electrically conductive member, strap, or wiper 36 is rigidly fixed to slider block 34, and includes a pair of downwardly projecting, resilient contacts 38 which ride along the lengths of a pair of cores or rods 40 and 42 during longitudinal travel of slider block 34.

Rods 40 and 42 are rigidly secured to base 24 in any suitable manner. Insulated resistance wire 12 is wound about rod 40, and insulated resistance wire 14 is wound about rod 42. The upper surface portion of wires 12 and 14 which will be engaged by wiper 36 is abraded to remove the insulation. Wires 12 and 14 are insulated from each other, but will be in electrical contact with wiper 36 when adjacent the wiper 36. An electrical lead 44 is connected to the right end of wire 12, and an electrical lead 46 is connected to the left end of wire 14, as viewed in FIGURE 2. It will be apparent that this arrangement provides a circuit and operation like that illustrated in FIGURE 1, the means 22 of FIGURE 1 taking the form of the slider block 34, wiper 36, and the threaded rod 30 mounted to plates 26 and 28.

The form and arrangement of resistive units 12 and 14 may be made to conform to the peculiar requirements of any particular application, as will be obvious to those skilled in the art, and applicant does not desire to be restricted to any of the particular embodiments herein illustrated and described.

Figure 3:
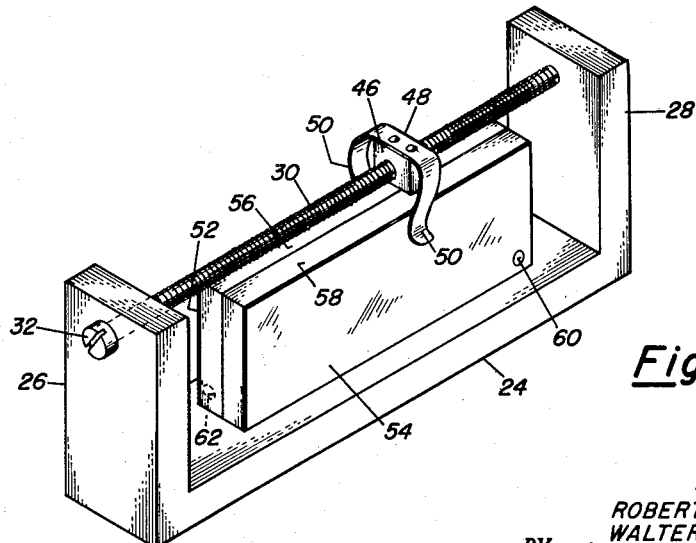
FIGURE 3 is a perspective view of a second embodiment of the present invention.

Referring now to FIGURE 3, there is illustrated another embodiment of resistor device 10, and which is very similar to the device illustrated in FIGURE 2, including a base 24 having end plates 26 and 28, a threaded member 30 which is rotatable by a screw head 32, and a slider block 46 made of electrical insulating material like that of sliding block 34. An electrical contact or wiper 48 is rigidly secured to slider block 46, and includes a pair of transversely and downwardly extending, resilient wiper arms 50.

Wiper arms 50 are slidable against the side surfaces of resistive layers or elements 52 and 54. Elements 52 and 54 in this embodiment comprise metal film depositions or slurry compositions carried by a pair of ceramic or electrical insulating slabs 56 and 58, respectively.

Slabs 56 and 58 extend longitudinally along an axis parallel to threaded member 30 so that wiper arms 50 are slidable along the lengths of the deposited resistive layers 52 and 54.

As is well known in the art, resistive layers of various compositions may be provided, it being important in the present invention only that layers or resistive elements 52 and 54 be characterized by temperature coefficients which are different. Further, the resistivity of each layer is uniform so that the resistance is uniformly cumulative from the point of connection with the external circuit. The lower right corner of resistive element 54 is connected at point 60 to one lead (not shown) of the external circuit, and the lower left corner of resistive element 52 is connected at point 62 to the other lead (not shown) of the external circuit, the general circuitry being identical to that illustrated diagrammatically in FIGURE 1.

Figure 4:
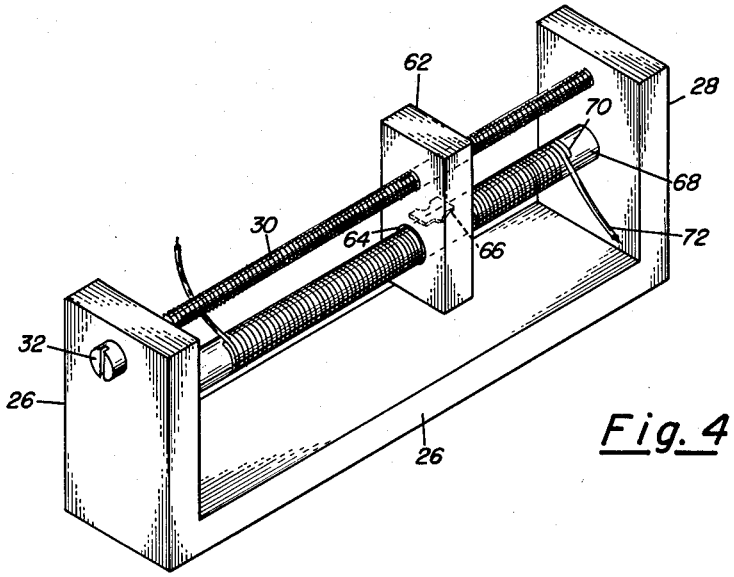
FIGURE 4 is a perspective view of a third embodiment.

FIGURE 4 illustrates yet another embodiment of the present invention, comprising a base 24 having end plates 26 and 28, a threaded rod or member 30 rotatable by a screw head 32 and carrying a slider block 62 made of electrical insulating material and including an opening 64 therethrough. An electrical contact member or wiper 66 of resilient material is integrally carried or molded within block 62 and includes a portion which protrudes into the space formed by the margins of opening 64.

A mandrel or rod 68 is rigidly connected to end plates 26 and 28 and extends longitudinally through opening 64. A pair of insulated resistive elements or wires 70 and 72 are wound side by side about rod 68, and elements 70 and 72 are abraded bare at their upper surface portions or contact areas so that wiper 66 establishes electrical contact between adjacent portions of elements 70 and 72 immediately below or adjacent the contacting portion of wiper 66. Elements 70 and 72 are made of materials which have different temperature coefficients, and the circuit of the arrangement of FIGURE 4 is like that of FIGURE 1.

Figure 5:
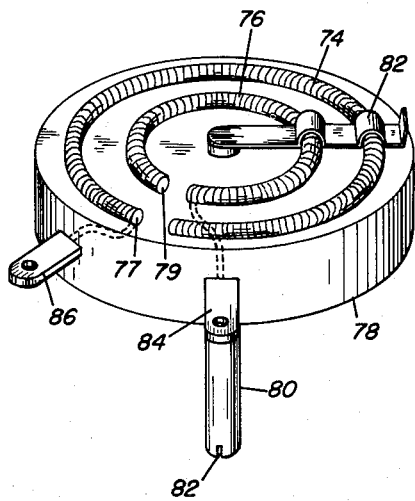
FIGURE 5 is a perspective view of a fourth embodiment.

FIGURE 5 illustrates a concentric arrangement of insulated resistive elements 74 and 76 wound upon cores 77 and 79, and arranged upon a base 78 which is preferably made of electrical insulating material and includes a central opening through which a shaft 80 is rotatably disposed. Shaft 80 is adjustably rotatable by inserting a screw driver or the like in the slotted end 82 of shaft 80.

Rotation of shaft 80 rotates a wiper 82 which is affixed to the upper end of shaft 80. Wiper 82 includes semicircular portions which effect electrical contact with elements 74 and 76, the upper surface portions of elements 74 and 76 being removed to allow such contact. An end of element 74 is electrically coupled to a terminal 84, and an end of element 76 is electrically coupled to a terminal 86. The thermal coefficients of elements 74 and 76 are different, as was the case in the other embodiments described, and the circuit of the embodiment of FIGURE 5 is the same as that of FIGURE 1.

Figure 6:
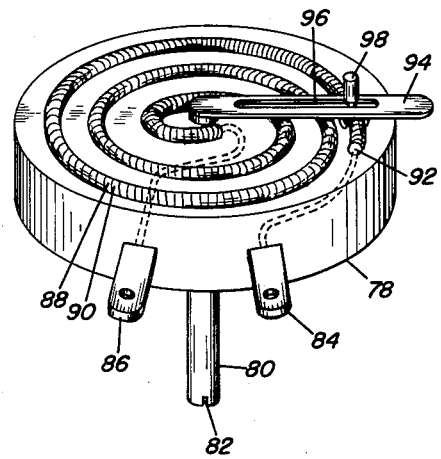
FIGURE 6 is a perspective view of a fifth embodiment.

Referring now to FIGURE 6, there is illustrated a helical arrangement of a pair of insulated resistive elements 88 and 90 which are wound in side-by-side relationship about a central core 92, and arranged upon base 78 through which is rotatably disposed the shaft 80. A wiper arm 94 is secured to the upper end of shaft 80, and includes a slot 96 within which is readily slidable an electrical contact 98 which serves to bridge adjacent windings or portions of elements 88 and 90 with which it is in contact. The upper surface portions or contact areas of elements 88 and 90 are abraded or removed to make such contact possible while still insulating elements 88 and 90 from each other. Elements 88 and 90 are connected to suitable terminals 84 and 86, and the whole provides a circuit arrangement as illustrated in FIGURE 1.

Figure 7:
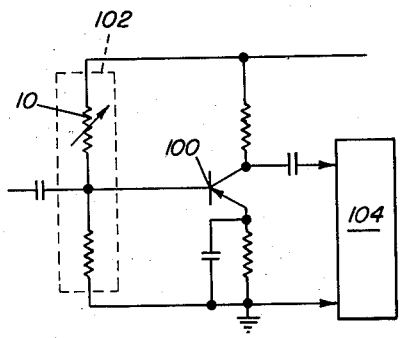
FIGURE 7 is a schematic circuit of a portion of a single stage amplifier employing a resistor device according to the present invention.

FIGURE 7 illustrates the use of the present invention, diagrammatically illustrated by the numeral 10, to maintain constant operating conditions in a representative form of electrical circuit. The circuit illustrated is the well known single stage amplifier. Any change in gain of transistor 100 with increasing temperature is offset by the increasing resistance of device 10 used in the bias voltage divider 102. That is, the undesired change in gain of transistor 100 with temperature is predetermined, and device 10 is adjusted so that its temperature coefficient will balance the temperature coefficient of transistor 100 by increasing the effective resistance of device 10. In this way a constant output is provided for the following circuitry which is designated generally 104.

Figure 8:
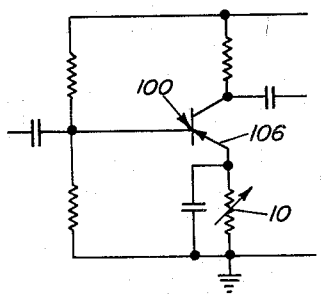
FIGURE 8 is a schematic circuit of a portion of a single stage amplifier employing a resistor device according to the present invention, in a slightly different manner from that illustrated in FIGURE 7.

FIGURE 8 illustrates essentially the same circuit as FIGURE 7 except that device 10 is used in the circuit of the emitter 106 of transistor 100. Device 10 here functions to provide increased resistance with temperature, thereby reducing the base to emitter bias voltage. It is noted that this use of device 10 also has the advantage of preventing thermal runaway by limiting the emitter current.

Various other uses for device 10 will immediately suggest themselves to those skilled in the art, including the stabilization of transistors in audio amplifiers, stabilization of multi-vibrator type oscillators, direct control of servo systems, and automatic overload protection in analogous circuits. Another use that suggests itself is the measurement of temperature coefficients of circuit components. The present device 10 would be calibrated so that for each of the many longitudinal positions of, for example, the slider block 34 of FIGURE 1, the corresponding temperature coefficient of device 10 would be indicated. That is, the amount of resistance charge for a given temperature rise or fall, as controlled by the position of block 34, would be known. Next, the unknown circuit component and the calibrated device 10 are electrically coupled together and subjected to the same temperature change, as, for example, in an oven. The output of the circuit component, or some other indication of its operation, is then analyzed with suitable instrumentation, and such change as may occur upon temperature change is compensated for by adjustment of device 10 until compensation is complete. At this point device 10 is checked to determine the temperature coefficient which was necessary to effect complete compensation, and this temperature coefficient will be the previously unknown temperature coefficient of the circuit component being tested.

There has been described and illustrated a temperature responsive resistor whose temperature coefficient is adjustable to thereby adjustably compensate for the temperature coefficient of circuit components. It is connected in series with the circuit component to be protected, and the resistive elements thereof are electrically spaced or insulated from each other, being connected together only by a member or wiper which is movable along the lengths of the resistive elements to insert either more or less resistance with temperature increase, as desired. The resistance of each resistive unit is uniformly cumulative along its length, and the two resistive units are matched so that their total resistance at some standard temperature is the same regardless of the position of the wiper which electrically interconnects them. The two resistive units are preferably spaced apart from each other and are not in electrical contact except to the extent provided by the common wiper element. In addition, suitable housings are employed to protect the components of the present invention from dust, and exposure to environmental conditions.

While certain preferred embodiments of the invention have been specifically disclosed, it is understood that the invention is not limited thereto as many variations will be readily apparent to those skilled in the art and the invention is to be given its broadest possible interpretation within the terms of the following claims:

We claim:

1. A temperature responsive resistor comprising a first resistive element; a second resistive element made of a material having a temperature coefficient of resistivity different from the material of said first resistive element; an electrically conductive contact member in engagement with and connecting in series said first resistive element and said second resistive element; and means coupled to said contact member and operative to adjust the position of said contact member relative to said first resistive element and said second resistive element, the total resistance of said resistor, at a predetermined temperature, being the same for any said position of said contact member, said total resistance being different at a temperature other than said predetermined temperature in proportion to the amounts of said first and second resistive elements which are then connected in series and the temperature coefficients of resistivity thereof.

2. A resistor according to claim 1 and characterized to include a pair of spaced cores made of electrical insulating material, and upon which said first resistive element and said second resistive element are arranged, respectively, said contact member being slidably movable over said resistive elements by said means.

3. A resistor according to claim 1 and characterized to include a pair of concentric spaced cores made of electrical insulating material, and upon which said first resistive element and said second resistive element are arranged, respectively, said contact member being slidably rotatable over both said resistive elements by said means.

4. A resistor according to claim 1 and characterized to include a core made of electrical insulating material, and upon which said first resistive element and said second resistive element are wound in side-by-side relationship, said contact member bridging a pair of adjacent windings of said resistive elements and slidably movable by said means to bridge a different pair of adjacent windings.

5. A resistor according to claim 1 wherein said first resistive element and said second resistive element are in the form of layers electrically separated from each other and over which said contact member is slidably movable by said means.

6. In combination, an electrical circuit including a circuit component having a predetermined temperature coefficient, a temperature responsive resistor electrically coupled to said circuit component and comprising a pair of resistive elements having different temperature coefficients of resistivity, an electrically conductive member in engagement with and connecting in series said pair of resistive elements, and means coupled to said contact member and operative to adjust the position of said contact member relative to said pair of resistive elements to thereby provide a temperature coefficient of resistivity which is a composite of the temperature coefficients of resistivity of said pair of resistive elements, and which may be varied to precisely balance the temperature coefficient of said circuit component.

References Cited in the file of this patent

UNITED STATES PATENTS

| | | |
|---|---|---|
| 381,304 | Weston | Apr. 17, 1888 |
| 1,884,877 | Rypinski | Oct. 25, 1932 |
| 1,944,329 | Langley | Jan. 23, 1934 |
| 2,050,703 | Johnson | Aug. 11, 1936 |
| 2,440,691 | Jira | May 4, 1948 |